United States Patent [19]

Hasegawa et al.

[11] Patent Number: 5,390,074
[45] Date of Patent: Feb. 14, 1995

[54] CHIP-TYPE SOLID ELECTROLYTIC CAPACITOR AND METHOD OF MANUFACTURING THE SAME

[75] Inventors: Nobuo Hasegawa; Sumio Nishiyama; Hideto Yamaguchi, all of Uji; Takashi Ida, Kyoto; Junichi Kurita, Yawata; Koji Ueoka, Neyagawa; Yasuhiro Kobashi, Yawata; Hideo Hashimoto, Moriguchi, all of Japan

[73] Assignee: Matsushita Electric Industrial Co., Ltd., Osaka, Japan

[21] Appl. No.: 948,577

[22] Filed: Sep. 23, 1992

[30] Foreign Application Priority Data

Sep. 30, 1991 [JP] Japan .................................. 3-250982
Sep. 30, 1991 [JP] Japan .................................. 3-251085
Sep. 30, 1991 [JP] Japan .................................. 3-251088
Sep. 30, 1991 [JP] Japan .................................. 3-251089
Feb. 14, 1992 [JP] Japan .................................. 4-027730

[51] Int. Cl.$^6$ ......................... H01G 9/05; H01G 9/24
[52] U.S. Cl. .................................. 361/540; 29/25.03; 361/529; 361/533
[58] Field of Search ............... 29/25.03; 361/523, 524, 361/528, 529, 532, 533, 538, 539, 540

[56] References Cited

U.S. PATENT DOCUMENTS

| | | | |
|---|---|---|---|
| 3,855,505 | 12/1974 | Karlik, Jr. et al. | 361/540 |
| 4,093,972 | 6/1978 | Voyles | 361/540 |
| 4,231,075 | 10/1980 | Morimoto et al. | 361/540 |
| 4,247,883 | 1/1981 | Thompson et al. | 361/540 |
| 4,561,041 | 12/1985 | Crowley, Jr. et al. | 361/540 |
| 5,036,434 | 7/1991 | Kobayashi | 361/540 |
| 5,254,137 | 10/1993 | Mitani | 29/25.03 |

FOREIGN PATENT DOCUMENTS

0173192A1 3/1986 European Pat. Off.
2402934 4/1979 France.
3219493A1 12/1983 Germany.
59-222919 12/1984 Japan.
2256222 10/1990 Japan.

OTHER PUBLICATIONS

Patent Abstracts of Japan, vol. 15, No. 428 (E-1128) 30 Oct. 1991 & JP-A-31 79 716 (Matsushita Electric Ind. Co.) 5 Aug., 1991.
Patent Abstracts of Japan, vol. 14, No. 584 (E-1018) 27 Dec. 1990 & JP-A-22 56 222 (Matsushita Electric Ind. Co.) 17 Oct. 1990.
Patent Abstracts of Japan, vol. 10, No. 121 (E-401) 7 May 1986 & JP-A-60 254 646 (Fujitsu KK) 16 Dec. 1985.

Primary Examiner—Bruce A. Reynolds
Assistant Examiner—Gregory L. Mills
Attorney, Agent, or Firm—Stevens, Davis, Miller & Mosher

[57] ABSTRACT

A chip-type solid electrolytic capacitor includes a cathode conductive layer provided on a whole surface of a cathode layer formed on an outer surface of a capacitor element, which whole surface is opposite to a surface where an anode lead wire is lead out, and on a surface adjacent to the first-mentioned whole surface. With this arrangement, if the capacitor element is obliquely inserted into a mold during the formation of a resin shell, the inner walls of the mold will not come into contact with cathode layer of the capacitor element, but will instead come into contact with the cathode conductive layer to prevent the cathode layer from being exposed to the resin shell. As a result, any possible damage to the cathode layer of the capacitor element when the peripheral surface of the resin shell on a cathode side is subjected to roughening is prevented to eliminate defects in electric characteristics such as leakage of electric current and a tan$\delta$ value.

12 Claims, 11 Drawing Sheets

CHIP-TYPE SOLID ELECTROLYTIC CAPACITOR AND METHOD OF MANUFACTURING THE SAME

BACKGROUND OF THE INVENTION

The present invention relates to a chip-type solid electrolytic capacitor and a method of manufacturing it.

Recently the number of chip components has been drastically increasing due to reduction of weight and dimensions of an electronic equipment and improvement in a surface packaging technique. While size reduction and capacity increase of a chip-type solid electrolytic capacitor are progressing, there has been an increasing demand for further size reduction of a chip component itself.

Figure 10:
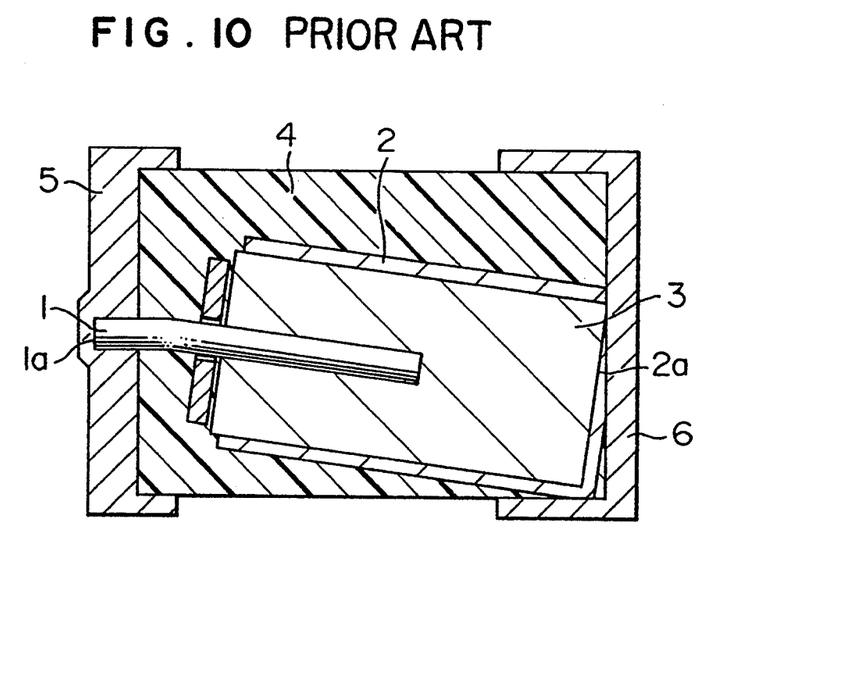
FIG. 10 is a cross-sectional view of a conventional chip-type tantalum solid electrolytic capacitor.

A conventional chip-type tantalum solid electrolytic capacitor has a structure shown in FIG. 10. More specifically, anodic oxidization is performed to form an oxidized dielectric film on the surface of a porous anode body including an anode lead wire 1 and made of tantalum which is a valve-metal. An electrolyte layer of manganese dioxide or the like is formed on this surface, and a carbon layer and a cathode layer 2 are laminated successively. Thus, a capacitor element 3 is constituted. The capacitor element 3 is coated with a resin shell 4 except for a projecting tip 1a of the anode lead wire 1 and an exposed portion 2a of the cathode layer 2. An anode metal layer 5 is coated and formed on that surface of the resin shell 4 where the anode lead wire 1 is led out, including the projecting tip 1a of the anode lead wire 1, and the peripheral surface adjacent to this surface. Also, a cathode metal layer 6 is coated and formed on a cathode-side end portion of the resin shell 4 including the exposed portion 2a of the cathode layer 2, and the peripheral surface adjacent to this surface.

Figure 11:
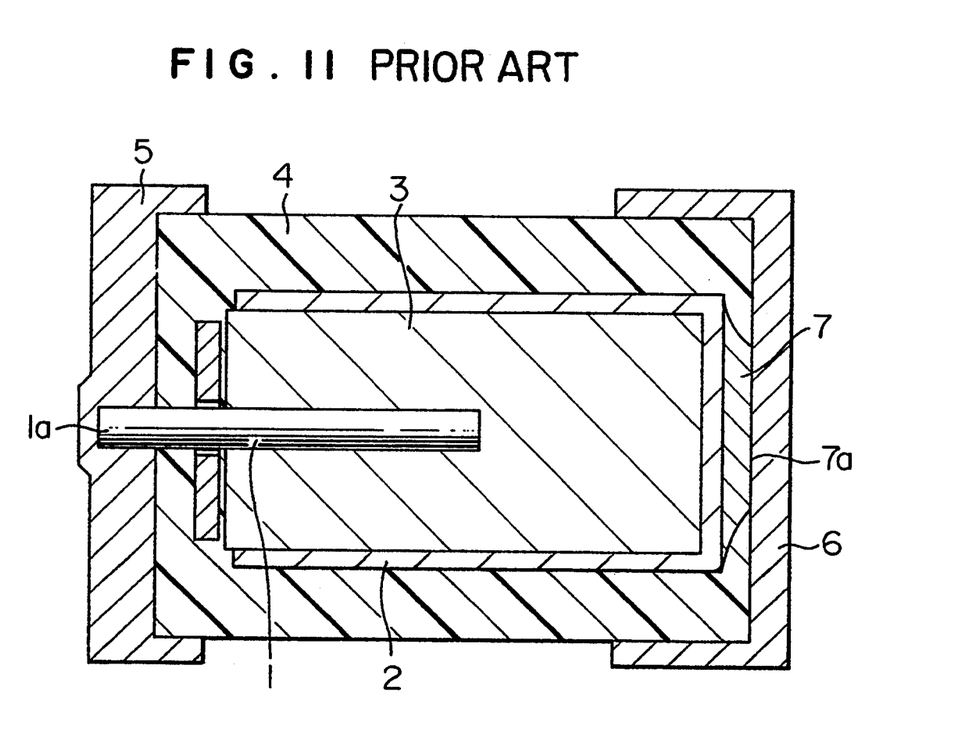
FIG. 11 is a cross-sectional view of another conventional chip-type tantalum solid electrolytic capacitor.

Another chip-type tantalum solid electrolytic capacitor of this kind is disclosed in Japanese Patent Unexamined Publication No. 2-256222. More specifically, as shown in FIG. 11, a conductive material 7 is connected to form a convex portion on an end portion of a cathode layer 2 of a capacitor element 3, and a box-like resin shell 4 is transfer-molded with an anode lead wire 1 being led out on one end. After that, the conductive material 7 is exposed by cutting a certain amount of the resin shell 4 from the cathode-side end portion of the resin shell 4 in the opposite direction of the anode lead wire 1. Then, an anode metal layer 5 is coated and formed on that surface of the resin shell 4 where the anode lead wire 1 is led out, including a projecting tip 1a of the anode lead wire 1, and the peripheral surface adjacent to this surface, and also, a cathode metal layer 6 is coated and formed on a cathode-side end portion of the resin shell 4 including an exposed portion 7a of the conductive material 7, and the peripheral surface adjacent to this surface.

In the chip-type tantalum solid electrolytic capacitors shown in FIGS. 10 and 11, the resin shell 4 is molded with the anode lead wire 1 led out of the capacitor element 3 being maintained horizontally. If the anode lead wire 1 is bent and deformed due to hanging down of the capacitor element 3 caused by its own weight, contact trouble in the previous step before molding, or the like, the thin cathode layer 2 coated on that surface of the cathode layer 2 of the capacitor element 3 which is opposite to the surface where the anode lead wire 1 is led out, and the peripheral surface adjacent to this surface, will be brought into contact with a mold so that resin coating will be insufficient. As a result, many visual demerits are induced owing to exposures of the thin cathode layer 2. In order to prevent these drawbacks, there has been a demand for improving the accuracy when the capacitor element is inserted into the mold. Also, in the chip-type tantalum solid electrolytic capacitor shown in FIG. 10, when the cathode-side peripheral surface of the shell is exposed to the outside, part of the resin shell 4 is removed by sandblast. In this case, since the cathode layer 2 must be exposed while checking the condition of the exposure of the cathode layer 2 so as not to break it, this step is extremely difficult to carry out, thereby degrading the productivity. Further, because the cathode layer 2 is thin, a leakage current and a tanδ value of the capacitor will be increased unfavorably if the cathode layer 2 is broken.

Moreover, in the chip-type tantalum solid electrolytic capacitors shown in FIGS. 10 and 11, the contact strength of the anode lead wire 1 and the resin shell 4 with the anode metal layer 5 formed on the anode lead surface of the resin shell 4 is low, and the contact strength of the cathode metal layer 6 formed on the cathode lead surface of the resin shell 4 with the resin shell 4 and the conductive material 7 is low. In this case, as the outer shape of the chip-type tantalum solid electrolytic capacitor becomes smaller, the areas of formations of the anode metal layer 5 and the cathode metal layer 6 become smaller. Consequently, if bending or thermal stress of a printed board is caused after such a chip-type tantalum solid electrolytic capacitor is mounted on the printed board, there is especially induced a problem that the cathode metal layer 6 is peeled off, so that insulation deterioration is apt to occur. Also, if an oxide is attached to the surface of the anode lead wire 1, or if molded resin burrs remain there, there is a problem that the tanδ value is increased.

Furthermore, in the chip-type tantalum solid electrolytic capacitors shown in FIGS. 10 and 11, the moisture which has entered the capacitor from the outside is likely to degrade the properties of leakage current, tanδ and the like. Especially in order to reduce the size of the solid electrolytic capacitor and to increase its capacity, plating is conducted to form the anode metal layer 5 and the cathode metal layer 6 which constitute the terminal sides. In such a case, however, since the solid electrolytic capacitor is immersed in a plating solution, there is a problem that free water and ionic substances enter the capacitor element 3 and are apt to deteriorate electric properties.

Figure 12A:
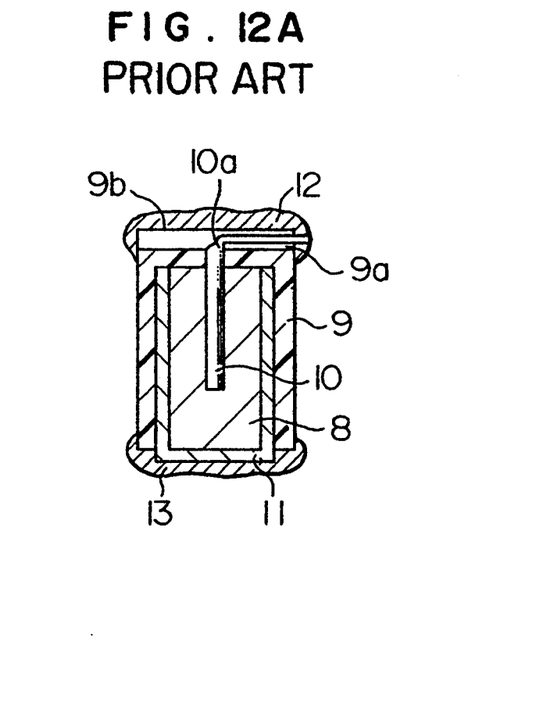
FIGS. 12A and 12B are a cross-sectional view and a perspective view, respectively, showing still another conventional chip-type tantalum solid electrolytic capacitor.
Figure 12B:
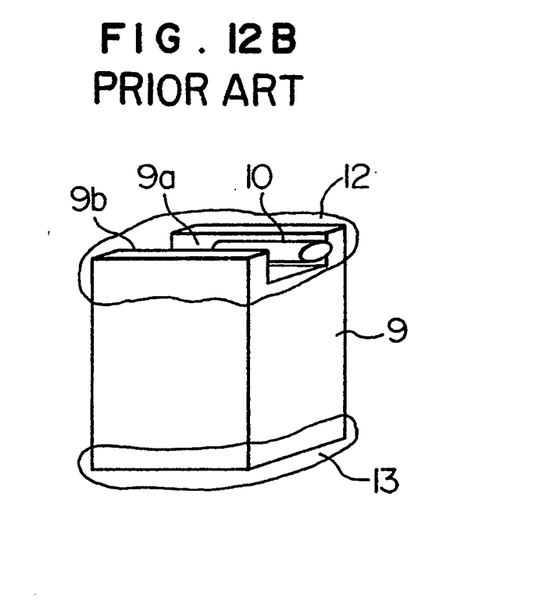

Another chip-type tantalum solid electrolytic capacitor of this kind is disclosed, for example, in Japanese Patent Unexamined Publication No. 59-222919. More specifically, as shown in FIGS. 12A and 12B, an anode lead 10 is led out from a recessed section 9a of a resin shell 9 which coats a solid electrolytic capacitor element 8. The anode lead 10 is flattened thinly on a plane perpendicular to a direction of a notch which divides a top surface 9b of the resin shell 9 in two, and also, the anode lead 10 is bent at a right angle at a joint portion 10a and extended inside of the recessed section 9a to be led out along the recessed section 9a. After that, an anode-side conductive layer 12 and a cathode-side conductive layer 13 are formed on the periphery of the anode lead 10 led out from the recessed section 9a, the top surface 9b of the resin shell 9, and a cathode lead portion 11 exposed from the resin shell 9 by coating them successively with a single layer or a plurality of layers of each of a conductive adhesive, a conductive plate, a solder and so forth.

With the above-described structure of the chip-type tantalum solid electrolytic capacitor shown in FIGS. 12A and 12B, however, when the anode lead 10 is bent at a right angle at the joint portion 10a, there are induced some problems. For example, because the anode lead 10 is resilient, a mechanical stress is exerted on that portion of the anode lead 10 which is implanted in the resin shell 9, so that this stress will break the resin shell 9; the anode lead 10 is bent to have an unfavorably curved shape such that the anode lead 10 will extend out of the recessed section 9a of the resin shell 9; and the position of bending of the anode lead 10 is uncertain.

SUMMARY OF THE INVENTION

A first object of the present invention is to solve the first problem of the conventional technique by providing a chip-type solid electrolytic capacitor which can eliminate a visual demerit that a cathode layer of a capacitor element is exposed from a resin shell coating, even if the capacitor element is inserted in a mold in an inclined state when the resin shell is molded.

A second object of the invention is to solve the second problem of the conventional technique by providing a chip-type solid electrolytic capacitor and a method of manufacturing it which can enhance the contact strength of an anode lead wire and a resin shell with an anode metal layer formed on an anode lead surface of the resin shell, as well as the contact strength of a cathode metal layer formed on a cathode lead surface of the resin shell with the resin shell and a cathode conductive layer, and which can remove oxides and resin burrs on the surface of the anode lead wire, thereby to improve the tanδ characteristics.

Moreover, a third object of the invention is to solve the third problem of the conventional technique by providing a chip-type solid electrolytic capacitor and a method of manufacturing it which can prevent free water and ionic substances from entering a capacitor element when the capacitor is used at a high temperature and high humidity or when the capacitor element is plated during the manufacture of the capacitor, in order to prevent deterioration of the electric properties.

Furthermore, a fourth object of the invention is to solve the fourth problem of the conventional technique by providing a chip-type solid electrolytic capacitor which can improve deterioration of the tanδ characteristics and poor tightness in a solder thermal resistance test and various environmental tests without increasing the substantial outer size of the capacitor.

DETAILED DESCRIPTION OF THE INVENTION

The preferred embodiments of the present invention will be hereinafter described with reference to the attached drawings.

Figure 1:
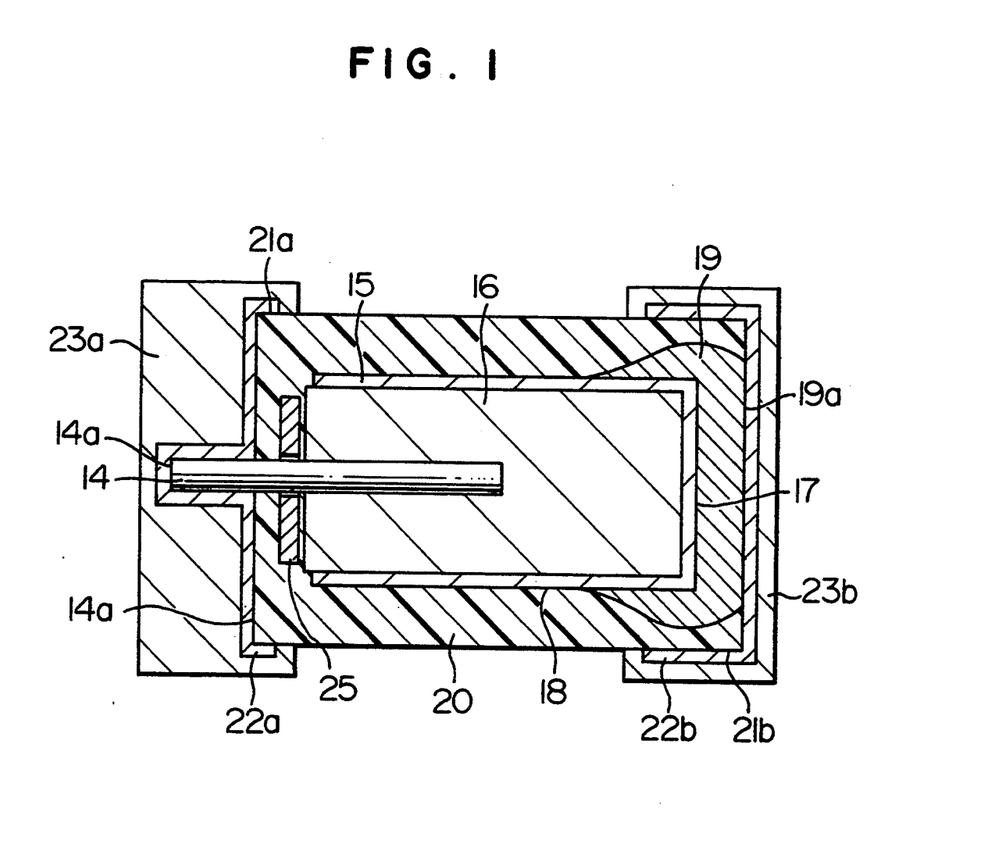
FIG. 1 is a cross-sectional view of a chip-type tantalum solid electrolytic capacitor according to a first embodiment of the present invention.

FIG. 1 illustrates a chip-type tantalum solid electrolytic capacitor according to a first embodiment of the invention, This chip-type tantalum solid electrolytic capacitor comprises: as shown in FIG. 1, an anode lead wire 14; a cathode conductive layer 19 formed on a cathode surface 17 of a capacitor element 16 on which a cathode layer 15 is formed, and on a part of a peripheral surface 18 adjacent to the surface 17; a resin shell 20 formed on them except for the tip of the anode lead wire 14 and a cathode lead surface 19a; an anode metal layer 22a and an anode-side solder layer 23a which are coated on an anode lead surface 14a and a resin-shell peripheral surface 21a adjacent to the surface 14a; and a cathode metal layer 22b and a cathode-side solder layer 23b which are coated on a cathode lead surface 19a opposite to the anode lead surface 14a and a resin-shell peripheral surface 21b adjacent to the surface 19a.

Figure 2:
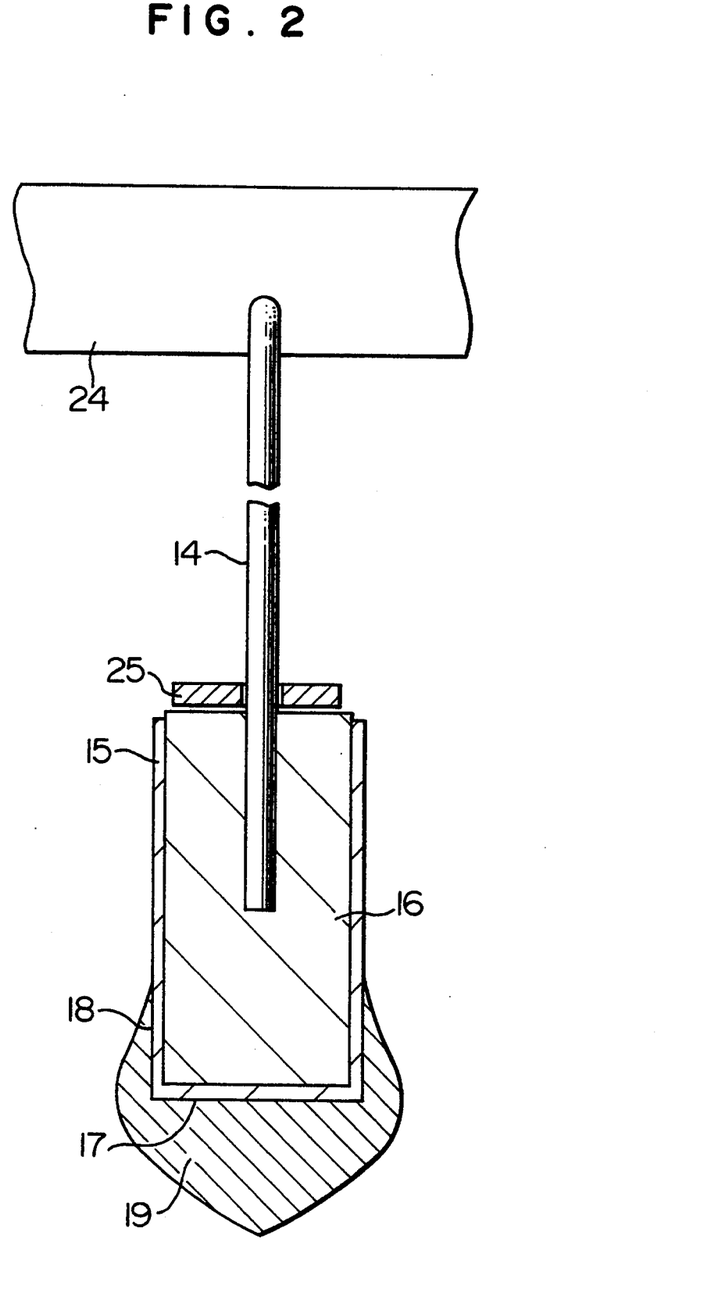
FIG. 2 is a cross-sectional view showing a condition of the same capacitor in which a cathode conductive layer is thickly formed on the capacitor.

FIG. 2 illustrates a condition of the chip-type tantalum solid electrolytic capacitor shown in FIG. 1, in which the cathode conductive layer 19 is thickly formed on the cathode surface 17 of the capacitor element 16 where the cathode layer 15 is formed.

Next, a manufacturing method of the chip-type tantalum solid electrolytic capacitor in the first embodiment of the invention will be explained.

First, the capacitor element 16 is constituted by forming an oxidized dielectric film, an electrolyte layer and the cathode layer 15 on a porous anode body of a valve-metal in which the anode lead wire 14 made of a tantalum wire connected to a metal ribbon 24 is implanted, with one end of the anode lead wire 14 being exposed, as shown in FIG. 2. Of the cathode layer 15 formed on the capacitor element 16, the cathode surface 17 opposite to the side of the anode lead wire 14 and a part of the peripheral surface 18 adjacent to this surface 17 are immersed in a slurry-type cathode conductive material made of a thermosetting resin containing silver powder as a major component and maintained at an appropriate viscosity. Thus, the cathode conductive material of a thick convex shape is attached to these surfaces, and when it is dried and cured in a constant temperature oven, the cathode conductive layer 19 is formed. A region of the cathode conductive layer 19 formed on that portion of the peripheral surface 18 of the cathode layer 15 which is adjacent to the surface where the anode lead wire 14 is led out is ½ to 1/5 with respect to a length of the peripheral surface 18 of the cathode layer 15 which is adjacent to the surface where the anode lead wire 14 is led out. The cathode conductive material may be one of Pd, Ni, and Cu or composite metal powder containing two or three of these metals and silver. The thermosetting resin is a resin which is cured when heated at 150° C. to 180° C. Also, as the cathode conductive material, a material having a low water and moisture absorbing property and excellent in moisture resistance is preferred, and also, the cathode conductive material must be a material which prevents a treatment solution used for the anode metal layer 22a and the cathode metal layer 23a, which will be described later, from entering the capacitor element 16. In this case, it may be a metallic material formed of a metal plate of Ni or the like. Further, a Teflon plate 25 is an insulating plate which prevents electrolyte from attaching to the anode lead wire 14 at the time of formation of the above-mentioned electrolyte layer.

After the cathode conductive layer 19 has been formed, the capacitor element 16 is set in a mold in a manner to have the anode lead wire 14 led out from one side, and the resin shell 20 is transfer-molded. In this case, the capacitor element 16 is set at the center of the mold. Due to bending and deformation of the anode lead wire 14, however, the cathode conductive layer 19 can be located substantially in contact with the mold, and the cathode conductive layer 19 can be partially exposed from the resin shell 20 in some cases. But the thin cathode layer 15 will not be damaged because it is protected by the thick cathode conductive layer 19. Also, since deformation stress of the anode lead wire 14 is removed, a property of leakage current and a property of a tanδ value will not be deteriorated. Further, visual demerits of the appearance owing to exposures in regions except the cathode conductive layer 19 will not be induced.

Next, part of the resin shell 20 is cut and removed along with the anode lead wire 14 so as to expose the anode lead surface 14a including a cut surface of the anode lead wire 14 on the same plane as the resin shell 20. On the other hand, part of the thick cathode conductive layer 19 is cut and removed along with the resin shell 20 so that the cathode lead surface 19a opposite to the anode lead surface 14a has a standard size of the chip-type tantalum solid electrolytic capacitor. Although strict control has conventionally been required not to break the thin cathode layer 15 at the time of slicing or grinding to expose the cathode lead surface 19a, no such control is necessary in this embodiment with the interposition of the thick cathode conductive layer 19. As a result, the productivity can be largely improved, and also, no damage on the cathode layer 15 will be caused, so that there will be no deterioration in electric properties of the leakage current and the tanδ value. Therefore, even when sandblast treatment is conducted in the next step to roughen the anode-side resin shell peripheral surface 21a and the cathode-side resin shell peripheral surface 21b, there can be eliminated the visual demerit that the cathode layer 15 is exposed from the resin shell 20.

Subsequently, alkaline degreasing and chemical etching are performed prior to pre-treatment of catalyst application. After that, electroless Ni plating is conducted to form a metal layer all over the resin shell 20 including the anode-side resin shell peripheral surface 21a and the cathode-side resin shell peripheral surface 21b, the anode lead surface 14a and the cathode lead surface 19a. Then, the surfaces to remain, i.e., the anode lead surface 14a, the anode-side resin shell peripheral surface 21a adjacent to the surface 14a, the cathode lead surface 19a, and the cathode-side resin shell peripheral surface 21b adjacent to the surface 19a, are masked with a resist material. By acid fusion of the exposed portion of the metal layer, an exposed insulating region of the resin shell 20 is formed so that the anode and the cathode are completely separated electrically. Then, the resist material is removed by alkali fusion. Thus, the anode metal layer 22a is formed on that side of the resin shell 20 where the anode lead wire 14 is exposed, in order to be connected to the anode lead wire 14, and also, the cathode metal layer 22b is formed on the exposed side of the cathode conductive layer 19 in order to be connected to the cathode conductive layer 19. Further, solder coating in a fused solder bath is performed to form the anode-side solder layer 23a on the anode metal layer 22a and the cathode-side solder layer 23b on the cathode metal layer 22b, respectively. Formation of the solder layers can be likewise effected by solder plating. Next, the capacitor is finished as a product after aging, marking and property inspection.

According to the first embodiment of the invention, as described so far, the thick cathode conductive layer 19 protects the thin cathode layer 15, so that there can be efficiently produced a chip-type tantalum solid electrolytic capacitor which does not have a visual demerit that the cathode layer 15 is exposed, and which is excellent in electric properties of the leakage current and the tanδ value.

Figure 3:
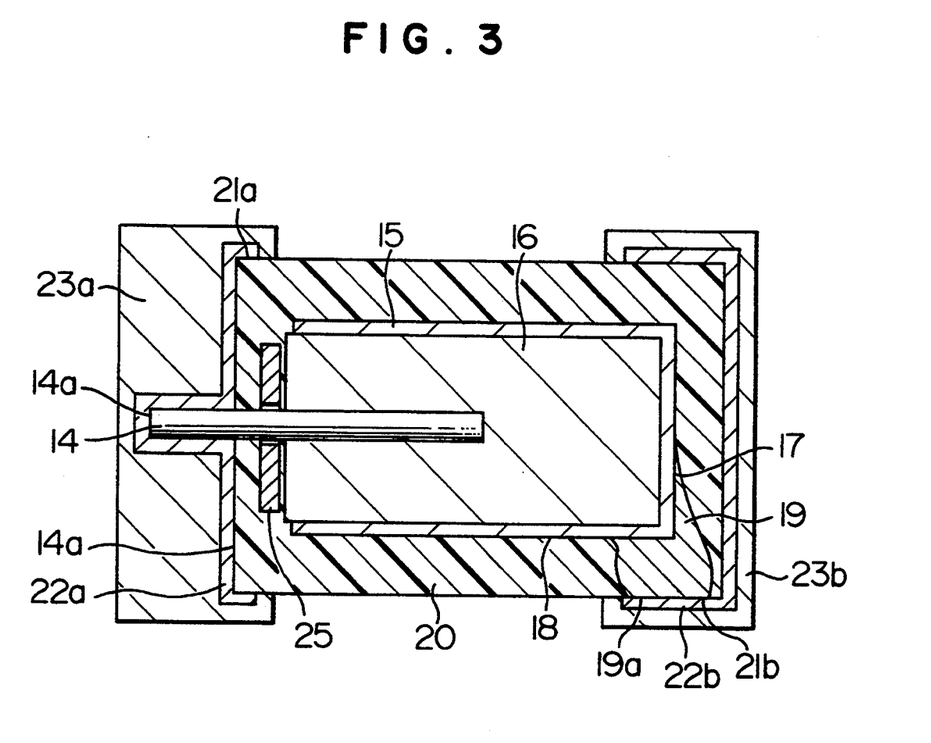
FIG. 3 is a cross-sectional view of a modified embodiment of this capacitor.

FIG. 3 illustrates a modification of the first embodiment of the invention. In the modified embodiment shown in FIG. 3, a cathode conductive layer 19 made of a thermosetting resin containing silver powder as a major component is formed on a lower portion of the peripheral surface 18 adjacent to the cathode layer 15 located on the cathode surface 17 opposite to the anode lead surface 14a. Then, the cathode conductive layer 19 of a convex shape with a thickness of 1.5 to 2.5 mm which is attached to the lower surface portion is dried and cured in a constant temperature oven. After that, the capacitor element 16 is set in a mold, with the anode lead wire 14 being led out from one side of it, and the resin shell 20 is transfer-molded. In this case, the cathode conductive layer 19 made of the thermosetting resin containing silver powder as a major component is located substantially in contact with the mold and constitutes a portion of the resin shell 20. Consequently, the cathode conductive layer 19 is to be exposed from the lower surface portion of the resin shell 20. However, in the condition where the resin shell 20 is formed, this portion is coated with the resin shell 20. Subsequently, the cathode lead surface 19a flush with the resin shell 20 is exposed by grinding, with an abrasive wheel or the like, part of the lower surface portion of the thick cathode conductive layer 19 along with the resin shell 20. According to the modification of the first embodiment of the invention, as described above, when the capacitor element 16 is inserted in the mold while maintaining the anode lead wire 14 horizontally, the capacitor element 16 is sustained by the thick cathode conductive layer 19 formed on the lower surface portion, so that the element will not be inclined due to its own weight. Therefore, even if the cathode conductive layer 19 is exposed from the lower surface portion of the resin shell 20 as a result of formation of the resin shell 20, the thin cathode layer 15 inside will be protected by the cathode conductive layer 19. Thus, the cathode lead surface 19a can be easily exposed by cutting part of the cathode conductive layer 19 along with the resin shell 20 without increasing deterioration in electric properties of the leakage current and the $\tan\delta$ value, so that an excellent productivity can be also obtained.

Figure 4A:
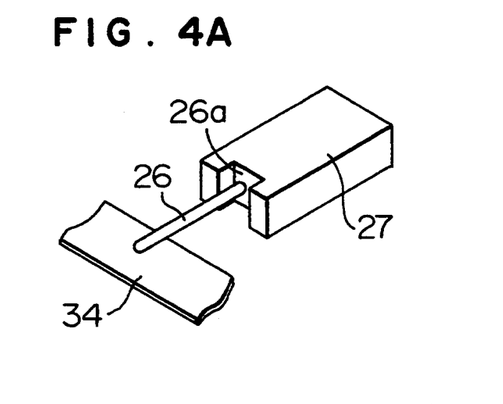
FIGS. 4A, 4B, 4C, 4D, 4E and 4F are outer-appearance perspective views showing a manufacturing process of a chip-type tantalum solid electrolytic capacitor according to a second embodiment of the invention.

FIGS. 4A, 4B, 4C, 4D, 4E and 4F illustrate a manufacturing process of a chip-type tantalum solid electrolytic capacitor according to a second embodiment of the invention. In FIG. 4A, the reference numeral 26a denotes an anode lead surface of a resin shell 27, and this anode lead surface 26a is located in the vicinity of an anode lead wire 26 and shaped concavely in a molded body of the resin shell 27. This concave shape serves to prevent the anode lead wire 26 from extending out of an outer size of the molded body of the resin shell 27 and to provide a large exposure area. On the other hand, a cathode conductive layer formed on the surface opposite to the side of the anode lead wire 26 is longer than an outer size of a final product, and the molded body of the resin shell 27 is accordingly longer.

Figure 4B:
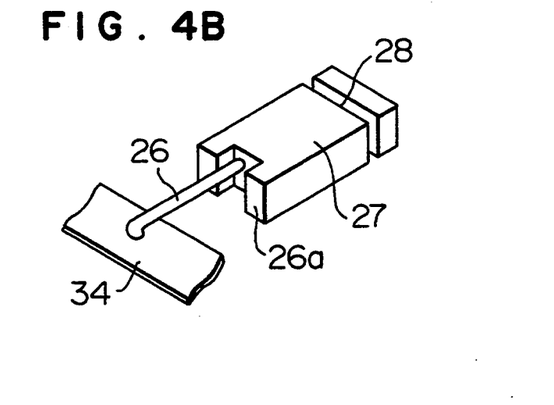

FIG. 4B shows a condition in which the molded body of the resin shell 27 is cut or ground to the specified outer size of the product. In FIG. 4B, the reference numeral 28 denotes a cathode lead surface which is exposed by cutting the resin shell 27 and the cathode conductive layer. By one or both of sandblast and chemical etching, the surface of the molded body of the resin shell 27 is roughened, thereby producing a bonding condition with fine pits and projections and activating the surface. This resin shell 27 is made of an epoxy resin alone or an epoxy resin containing fibrous silicon oxide having a grain size of 1 to 200 $\mu$m or a diameter of 2 to 20 $\mu$m, and a length of 10 to 1000 $\mu$m. A polyimide resin may be contained in addition to the silicon oxide mentioned above. Glass, alumina or titanium oxide is used for the sandblast, and the grain size is 100$\mu$ or less so that grains can enter into the concave portion shown in FIG. 4A. Hydrofluoric acid, permanganate or sodium hydroxide is used for the chemical etching in order to roughen the epoxy resin and silicon oxide which is a filler of the epoxy resin. When such surface toughening is effected by a combination of the sandblast and the chemical etching, the contact strength between the surface of the resin shell 27 and an anode metal layer 29 and a cathode metal layer 30 can be further enhanced.

Figure 4C:
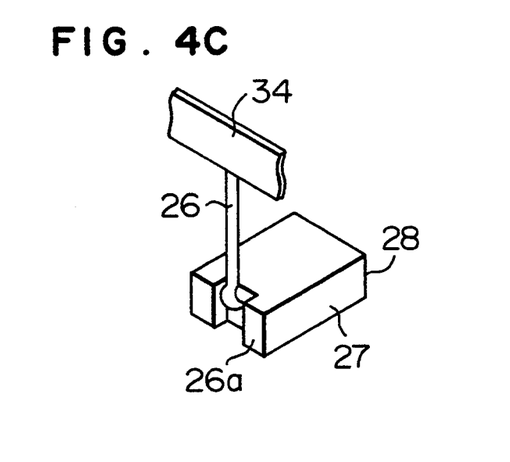

FIG. 4C shows a condition in which the anode lead wire 26 is bent upwardly in the concave portion of the anode lead surface 26a. By bending the anode lead wire 26 upwardly in the concave portion of the anode lead surface 26a in this manner, a large surface area of the anode lead wire 26 can be obtained, and also, the anode lead wire 26 can be encased in the concave portion of the anode lead surface 26a so that the capacitor can have an outer shape of a well-proportioned rectangular parallelopiped. Further, laser marking is employed to enable read positioning by a sensor, and consequently, a separation process can be also adopted.

Figure 4D:
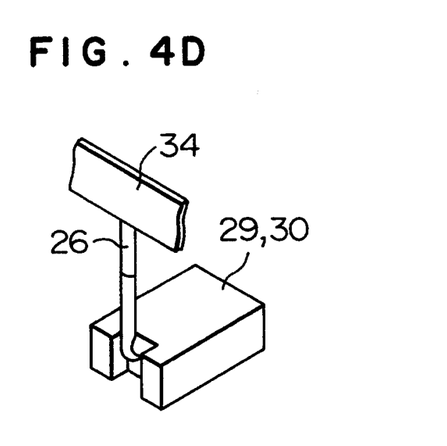

FIG. 4D shows a condition in which metal layers are formed. The metal layers are the anode metal layer 29 formed on the anode lead wire 26, the anode lead surface 26a and a part of the surface of the molded body of the resin shell 27, and the cathode metal layer 30 formed on the cathode lead surface 28 and a part of the surface of the molded body of the resin shell 27. After alkaline degreasing, chemical etching and pretreatment of catalyst application, electroless Ni plating is performed to form these metal layers 29, 30 on the anode lead wire 26, the anode lead surface 26a, the cathode lead surface 28 and the surface of the molded body of the resin shell 27. In this case, an excellent film thickness of the anode metal layer 29 and the cathode metal layer 30 is in a range of 0.5 to 4.0 $\mu$m in respect of the bonding strength with the substrate.

Figure 4E:
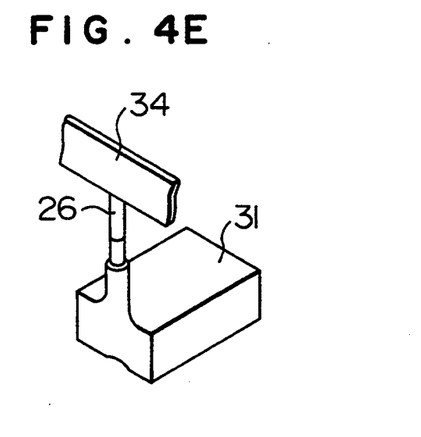

FIG. 4E shows a condition in which a photoresist resin of a negative type is coated. The reference numeral 31 denotes a resist resin layer. Ultraviolet rays are irradiated over a part of the resist resin layer 31 on the surfaces to remain, i.e., the anode lead surface 26a including the anode lead wire 26, the cathode lead surface 28 and those portions of the molded body of the resin shell 27 which are adjacent to these surfaces, so that these parts of the resist resin layer 31 are reacted to remain. After that, the central portion of the resist resin layer 31 on which ultraviolet rays have not been irradiated yet is melted, and subsequently, portions of the metal layers exposed by this melting are subjected to acid fusion. Finally, both the end portions of the resist resin layer 31 which have been reacted to the applied ultraviolet rays are removed by alkali fusion, and consequently, the anode metal layer 29 and the cathode metal layer 30 are exposed on the anode lead surface 26a including the anode lead wire 26, the cathode lead surface 28 and those portions of the molded body of the resin shell 27 which are adjacent to these surfaces. In this case, the anode metal layer 29 and the cathode metal layer 30 exposed on the portions of the molded body of the resin shell 27 constitute the anode and the cathode which are completely separated electrically by an insulating region formed on the central portion of the resin shell 27.

Figure 4F:
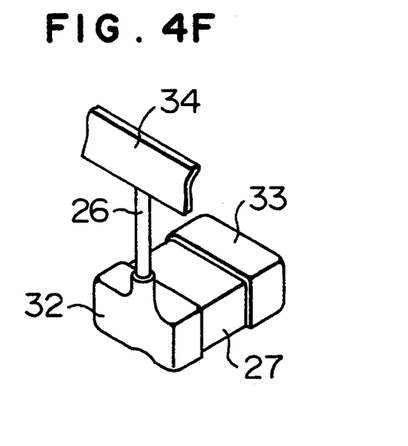

FIG. 4F shows a condition in which both the poles are coated with solder layers. The reference numeral 32 denotes an anode-side solder layer, and 33 denotes a cathode-side solder layer. These solder layers 32, 33 are formed by solder coating in a fused solder bath. The anode-side solder layer 32 coats the surface of the anode metal layer 29, whereas the cathode-side solder layer 33 coats the surface of the cathode metal layer 30.

After aging, thermal treatment and the like of the capacitor thus manufactured, the capacitor is separated as an individual piece from a metal ribbon 34 by cutting the anode lead wire 26 so that it has an outer size as a final product of a chip-type tantalum solid electrolytic capacitor. Then, it is inspected and finished.

In the above-described manufacturing process according to the second embodiment of the invention, the surface of the resin shell 27 is roughened. Therefore, at the time of formation of the anode metal layer 29 and the cathode metal layer 30, the anode metal layer 29 and the cathode metal layer 30 are formed while they are caught in the fine pits and projections on the surface of the resin shell 27. As a result, the contact strength of the anode metal layer 29 and the cathode metal layer 30 with the resin shell 27 can be increased so as to decrease their contact resistance and to improve the $\tan\delta$ characteristics.

Next, a modified embodiment A of the invention will be described. In the modified embodiment A, not only the surface of the resin shell 27 is roughened by one or both of sandblast and chemical etching, but also the surface of the anode lead wire 26 is roughened by one or both of sandblast and chemical etching at the time of surface roughening of the resin shell 27.

When the surface of the resin shell 27 and the surface of the anode lead wire 26 are roughened in this manner, fine pits and projections are formed on these surfaces, and also, oxidized films and resin burrs can be removed. Consequently, due to the bonding condition with the fine pits and projections and the surface activation, the contact strength of the resin shell 27 with the anode metal layer 29 and the cathode metal layer 30 can be further enhanced, thereby decreasing their contact resistance to improve the tan$\delta$ characteristics.

Another modified embodiment B of the invention will be described. In the modified embodiment B, not only is the surface of the resin shell 27 roughened by one or both of sandblast and chemical etching, but also, the surface of the anode lead wire 26 and the cathode lead surface 28 of the cathode conductive layer are roughened by one or both of sandblast and chemical etching at the time of surface roughening of the resin shell 27.

When the surface of the resin shell 27, the surface of the anode lead wire 26, and the cathode lead surface 28 of the cathode conductive layer are roughened in this manner, fine pits and projections are formed on these surfaces, and also, oxidized films and resin burrs can be removed. Consequently, due to the bonding condition with the fine pits and projections and the surface activation, the contact strength with the anode metal layer 29 and the cathode metal layer 30 can be further enhanced, thus decreasing their contact resistance to improve the tan$\delta$ characteristics.

Still another modified embodiment C of the invention will be described. In the modified embodiment C, only the cathode lead surface 28 of the cathode conductive layer is roughened by one or both of sandblast and chemical etching.

When the cathode lead surface 28 of the cathode conductive layer is roughened in this manner, fine pits and projections are formed on this cathode lead surface 28. Therefore, at the time of formation of the cathode metal layer 30, the cathode metal layer 30 is formed while it is caught in the fine pits and projections on the cathode lead surface 28. As a result, the contact strength between the cathode metal layer 30 and the cathode lead surface 28 can be increased so as to decrease their contact resistance and to improve the tan$\delta$ characteristics.

A further modified embodiment D of the invention will be described. In the modified embodiment D, not only is the surface of the resin shell 27 roughened by one or both of sandblast and chemical etching, but also, the cathode lead surface 28 of the cathode conductive layer is roughened by one or both of sandblast and chemical etching at the time of surface roughening of the resin shell 27.

When the surface of the resin shell 27 and the cathode lead surface 28 of the cathode conductive layer are roughened in this manner, fine pits and projections are formed on these surfaces, and therefore, due to the bonding condition with the fine pits and projections and the surface activation, the contact strength with the anode metal layer 29 and the cathode metal layer 30 can be further enhanced, thus decreasing their contact resistance to improve the tan$\delta$ characteristics.

Figure 5:
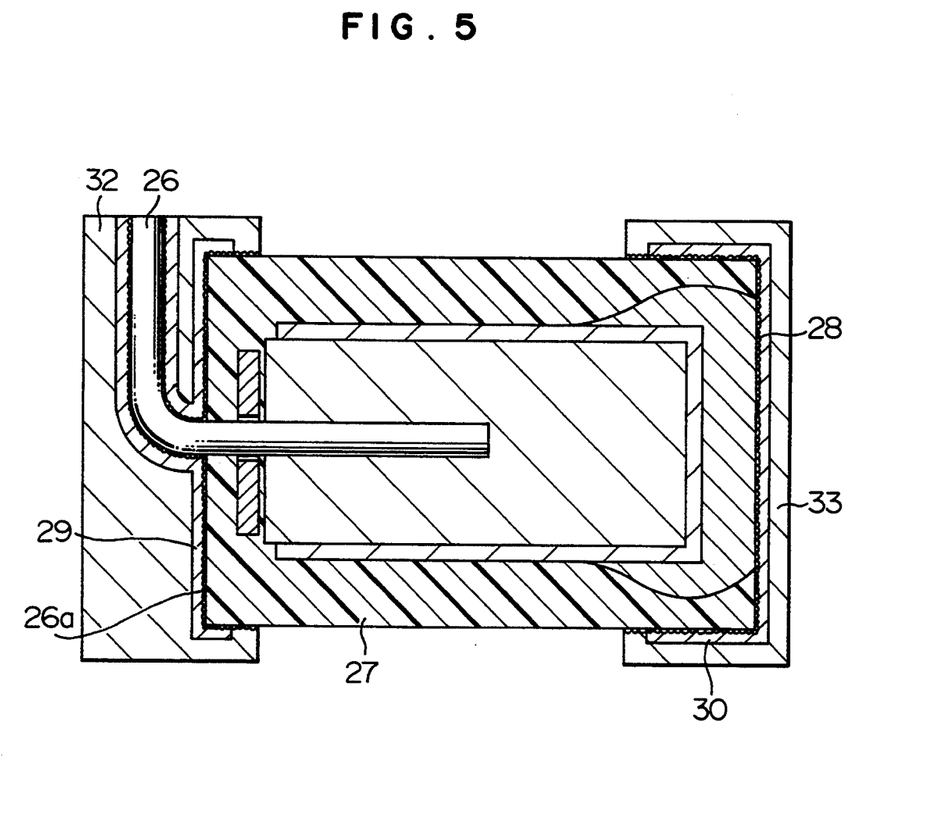
FIG. 5 is a cross-sectional view of a modified embodiment of this capacitor.

A different modified embodiment E of the invention will be described with reference to FIG. 5. In the modified embodiment E, only the surfaces of electrode terminal portions of the resin shell 27 on which the anode metal layer 29 and the cathode metal layer 30 are formed are selectively roughened by one or both of sandblast and chemical etching.

Alkaline degreasing, chemical etching and pretreatment of catalyst application are performed in the above-described formation of the anode metal layer 29 and the cathode metal layer 30. In the modified embodiment E described with reference to FIG. 5, however, only the surfaces of the electrode terminal portions on which the anode metal layer 29 and the cathode metal layer 30 are formed are selectively roughened during the surface roughening of the resin shell 27. In consequence, the surfaces of other non-electrode-terminal portions are not roughened, and accordingly, these portions have water repellency which serves to prevent treatment solutions in the formation of the anode metal layer 29 and the cathode metal layer 30 from entering the resin shell 27 through the surface, thereby reliably preventing these solutions from unfavorably influencing the tan$\delta$ characteristics.

Moreover, a chip-type tantalum solid electrolytic capacitor of this kind undergoes a moisture resistance test and a salt spray test. In the modified embodiment E described above, however, only the surfaces of the electrode terminal portions on which the anode metal layer 29 and the cathode metal layer 30 are formed are selectively roughened during the surface toughening of the resin shell 27. Therefore, the surfaces of other non-electrode-terminal portions are not toughened, and accordingly, these portions have water repellency which serves to prevent free water in the moisture resistance test and salt water in the salt spray test from entering inside of the resin shell 27 through the surface, thereby reliably preventing them from unfavorably influencing the tan$\delta$ characteristics.

Figure 6:
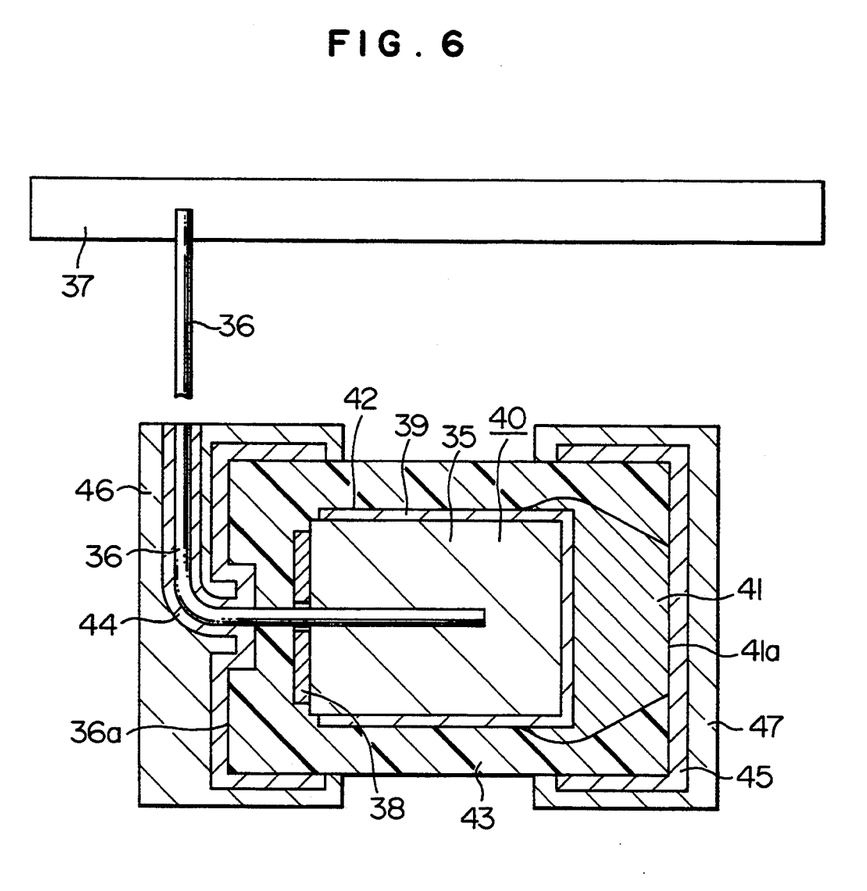
FIG. 6 is a cross-sectional view of a chip-type tantalum solid electrolytic capacitor according to a third embodiment of the invention.
Figure 7:
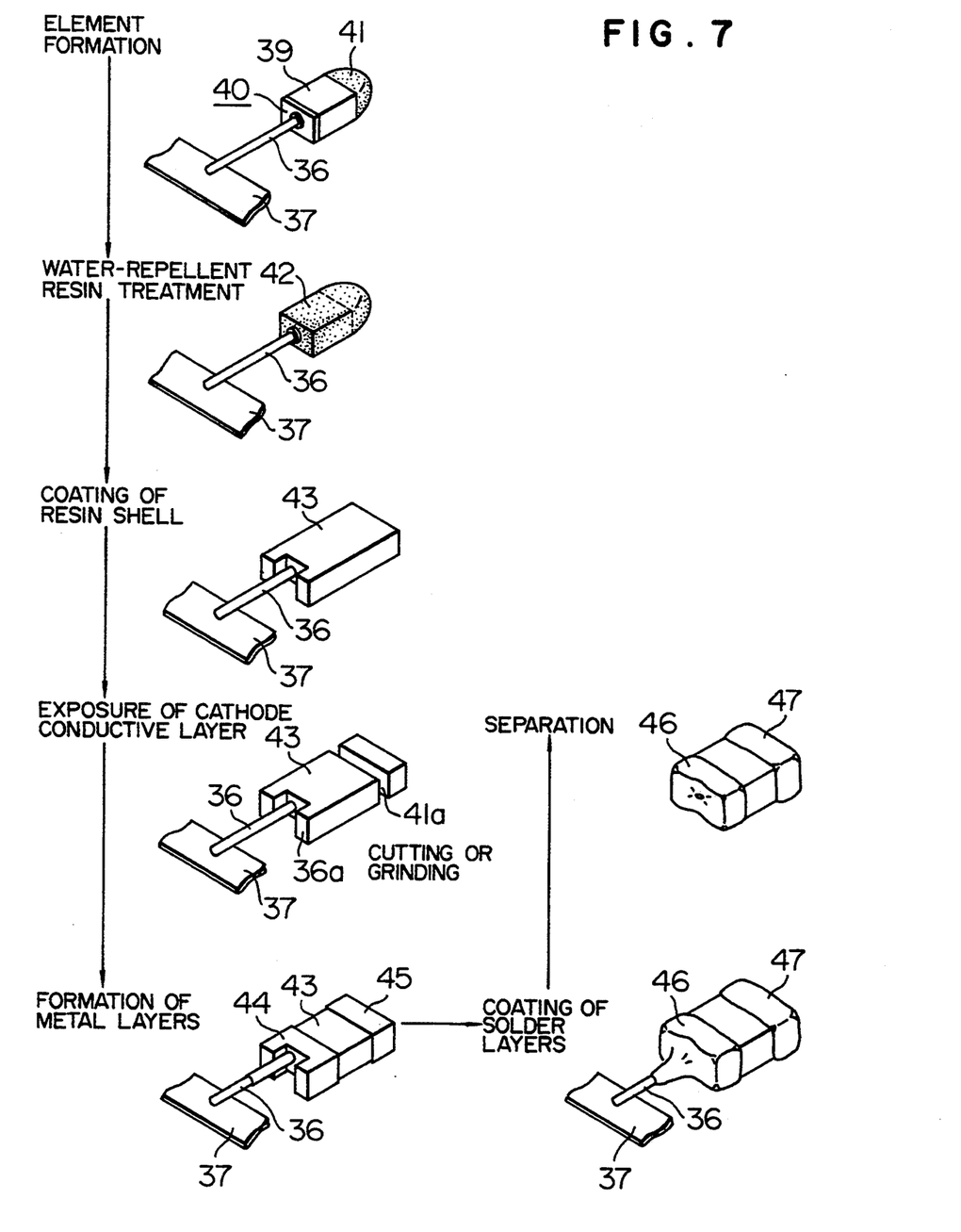
FIG. 7 is a chart of sequential steps in a manufacturing process of the same capacitor.

FIG. 6 is a cross-sectional view of a chip-type tantalum solid electrolytic capacitor according to a third embodiment of the invention, and FIG. 7 is a chart of sequential steps in a manufacturing process of this chip-type tantalum solid electrolytic capacitor. In FIGS. 6 and 7, the reference numeral 35 denotes a porous anode body formed by molding and sintering tantalum powder which is a valve-metal. An oxidized dielectric film is formed on the surface of the anode body 35 by anodic oxidation, and an electrolyte layer of manganese dioxide or the like is further formed on this surface. An anode lead wire 36 is made of a tantalum wire and led out from the anode body 35. This series of treatment processes on the surface of the anode body 35 are effected with the anode lead wire 36 being connected to a metal ribbon 37. The reference numeral 38 denotes a Teflon plate attached on the anode lead wire 36, and this Teflon plate 38 is an insulating plate which prevents manganese dioxide from ascending and attaching to the anode lead wire 36 when the electrolyte layer is formed on the anode body 35. A cathode layer 39 consisting of a carbon layer and a silver coating layer is laminated on the electrolyte layer of the anode body 35 by successive immersions so as to constitute a capacitor element 40. That portion of the cathode layer 39 of the capacitor element 40 which is located opposite to the side of the anode lead wire 36 is immersed in a coating material containing silver powder as a major component in order to laminate a cathode conductive layer 41 thereon. After that, the capacitor element 40 and the cathode conductive layer 41 in this condition are immersed in a silicone- or fluorine-base water-repellent resin 42 so that all the surfaces of the capacitor element 40 and the cathode conductive layer 41 are coated with this water-repellent resin 42. In this case, the water-repellent resin 42 of high permeability permeates inside of the porous anode body 35 through the immersion, thereby to form a protective film.

Next, the capacitor element 40 is transfer-molded and coated with an epoxy resin with the anode lead wire 36 being led out on one side, and then, a resin shell 43 is cut or ground to expose the cathode conductive layer 41. After alkaline degreasing, chemical etching and pretreatment of catalyst application, electroless Ni plating is performed to form an anode metal layer 44 made of Ni and a cathode metal layer 45 made of Ni on the surfaces of the anode lead wire 36, an anode lead surface 36a, a cathode lead surface 41a and a molded body of the resin shell 43. In this case, a suitable layer thickness of the anode metal layer 44 and the cathode metal layer 45 is in a range of 0.5 to 5.0 µm in respect of the bonding strength with the substrate. Then, solder layers 46 and 47 are formed on the anode and the cathode through the anode metal layer 44 and the cathode metal layer 45. The chip-type tantalum solid electrolytic capacitor thus manufactured is separated as an individual piece from the metal ribbon 37 by cutting the anode lead wire 36 so that the capacitor has an outer size as a product, and it is finished after inspection.

In the above-described third embodiment of the invention, the oxidized dielectric film, the electrolyte layer, and the cathode layer 39 consisting of the carbon layer and the silver coating layer are successively laminated on the surface of the porous anode body 35 formed by molding and sintering tantalum powder, and the capacitor element 40 and the cathode conductive layer 41 are coated with the silicone- or fluorine-base water-repellent resin 42 by immersing them in the water-repellent resin 42. Through such immersion, the water-repellent resin 42 of high permeability not only coats the outermost surface of the capacitor element 40 but also permeates inside of the porous anode body 35 to thereby form the protective film. Therefore, in the electroless Ni plating step for forming the anode metal layer 44 made of Ni and the cathode metal layer 45 made of Ni, even if the capacitor element 40 is exposed to severe conditions, i.e., even if the capacitor element 40 is immersed in a strong-acid/strong-alkali solution at high temperature, the above-mentioned protective film can prevent deterioration of the electric characteristics (tanδ). Moreover, if the capacitor is used in a high-temperature and high-humidity environment, the protective film will prevent the free water and ionic substances, which have entered from the outside, from contacting with the porous anode body 35 made of a valve-metal. Thus, deterioration of the electric characteristics (tanδ) of the chip-type solid electrolytic capacitor can be prevented.

Figure 8:
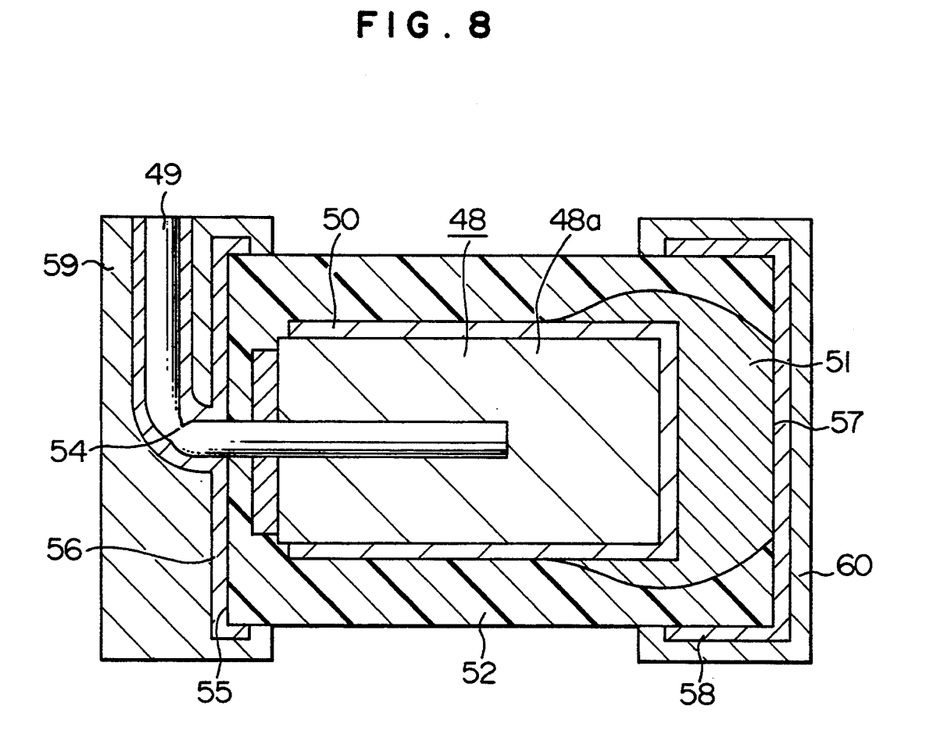
FIG. 8 is a cross-sectional view of a chip-type tantalum solid electrolytic capacitor according to a fourth embodiment of the invention.
Figure 9:
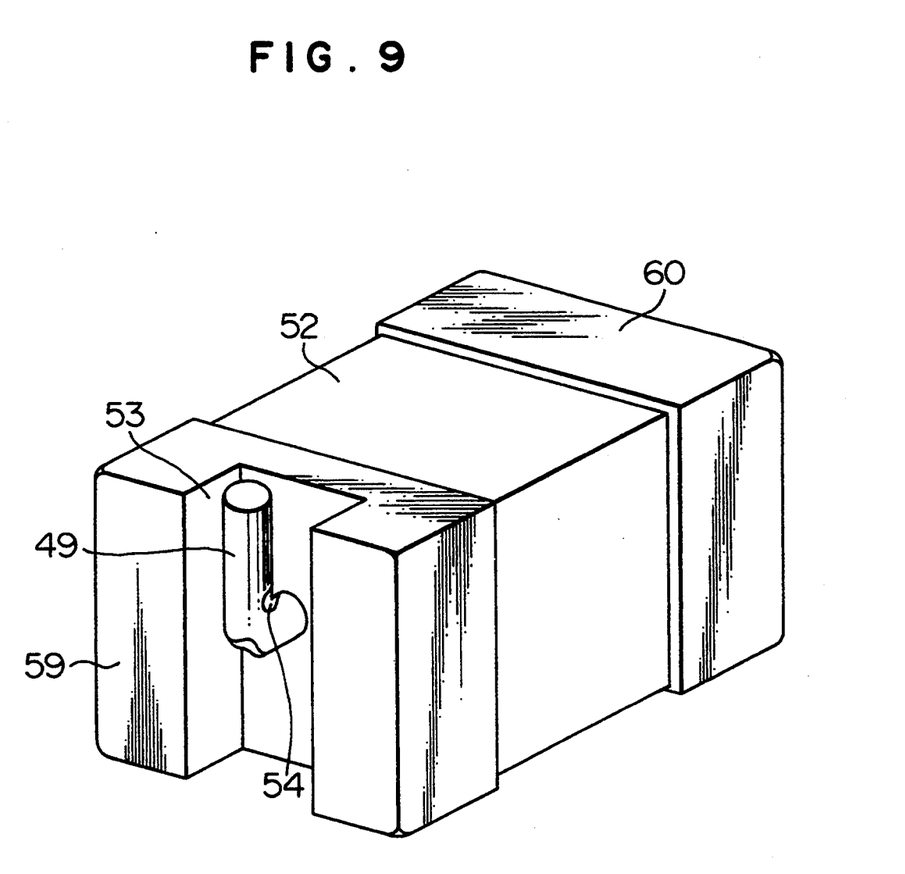
FIG. 9 is a perspective view of the same capacitor.

FIG. 8 is a cross-sectional view of a chip-type tantalum solid electrolytic capacitor according to a fourth embodiment of the invention, and FIG. 9 is a perspective view of this chip-type tantalum solid electrolytic capacitor. In FIGS. 8 and 9, the reference numeral 48 denotes a capacitor element. The capacitor element 48 is constituted by forming an oxidized dielectric film on the surface of a porous anode body 48a made of tantalum which is a valve-metal and provided with an anode lead wire 49, according to a general anodic oxidization method, and by further laminating an electrolyte layer and a cathode layer 50 consisting of a carbon layer and a silver coating layer successively on the film. After that, a cathode conductive layer 51 made of a conductive material is thickly formed on that surface of the cathode layer 50 formed on the periphery of the capacitor element 48 which is located on the opposite side of the anode lead wire 49, and then, a part of the anode lead wire 49, the capacitor element 48 and the whole cathode conductive layer 51 are transfer-molded and coated with a resin shell 52, with the anode lead wire 49 of the capacitor element 48 being led out on one side. In this case, a concave portion 53 is formed on the side of the anode lead wire 49 during the molding of the resin shell 52. Subsequently, a cathode-side end surface of the resin shell 52 is cut or ground to form an exposed portion of the cathode conductive layer 51 while checking an exposed state of the cathode conductive layer 51.

Next, the anode lead wire 49 is bent inside of the concave portion 53. In this case, a weakened point 54 is formed on a part of the anode lead wire 49 by rolling or grinding, and the anode lead wire 49 is bent, with the weakened point 54 being the fulcrum, so that the anode lead wire 49 will be encased in the concave portion 53. Then, an anode metal layer 56 is formed, by plating, on the anode lead wire 49 and an anode lead surface 55 of the resin shell 52, and also, a cathode metal layer 58 is formed, by plating, on the cathode conductive layer 51 and a cathode lead surface 57 of the resin shell 52. After that, this capacitor element is immersed in a fused solder bath to form an anode-side solder layer 59 and a cathode-side solder layer 60 on the anode metal layer 56 and the cathode metal layer 58, respectively. Thus, a chip-type tantalum solid electrolytic capacitor of 16 V and 6.8 µF is manufactured.

In the above-described fourth embodiment of the invention, the resin shell 52, which coats the capacitor element 48 with the anode lead wire 49 being led out on one side, has the concave portion 53 formed on the side of the anode lead wire 49, and the anode lead wire 49 is formed with the weakened point 54 and bent so that the anode lead wire 49 will be encased in the concave portion 53. Since the anode lead wire 49 is bent at the weakened point 54, it can be bent easily. Also, it can be always bent at a certain position, so that the anode lead wire 49 will not extend out of the outer size of the capacitor, and that a large length of the anode lead wire 49 can be led out from the resin shell 52, thereby increasing an area of contact between an anode-side terminal portion formed on the side of the anode lead wire 49, and the anode lead wire 49, and substantially enhancing their bonding strength. Thus, it is possible to eliminate deterioration of the tans characteristics and poor tightness in a solder heat resistance test and various environmental tests.

In the above embodiment, one portion of the anode lead wire 49 is rolled or ground to form the weakened point 54. When the weakened point 54 is U-shaped or V-shaped, bending of the anode lead wire 49 can be effected smoothly.

Moreover, in the second, third and fourth embodiments of the invention, the cathode conductive layer is formed separately from the cathode layer of the capacitor element. However, the cathode layer may be designed to be directly exposed from the end surface of the resin shell when the capacitor element is coated with the resin shell.

As obviously understood from the above description, the chip-type solid electrolytic capacitor of the invention includes the cathode conductive layer which is formed on that surface of the cathode layer of the capacitor element which is located opposite to the surface where the anode lead wire is led out, and on a part of the peripheral surface adjacent to this surface, so that even if the capacitor element is obliquely inserted in the mold for molding the resin shell, the cathode conductive layer will be brought into contact with an inner wall of the mold to modify the inclination of the capacitor element. Therefore, when sandblast treatment is performed to roughen the cathode-side peripheral surface of the resin shell, there will not be caused any visual demerit of the cathode layer being exposed from the resin shell.

Further, in the chip-type solid electrolytic capacitor of the invention, the surface of the resin shell, or the surface of the resin shell and the surface of the anode lead wire, or the cathode lead surface of the cathode conductive layer, or the surface of the resin shell and the cathode lead surface of the cathode conductive layer, or the surface of the resin shell and the surface of the anode lead wire and the cathode lead surface of the cathode conductive layer, are roughened by one or both of sandblast and chemical etching so that the bonding condition with fine pits and projections is formed on these surfaces. Thus, the contact strength with the anode metal layer and the cathode metal layer can be enhanced, and also, the oxidized film and resin burrs on the surface of the anode lead wire can be removed. Consequently, the contact resistance on the anode metal layer and the cathode metal layer will be decreased, thereby to improve the $\tan\delta$ characteristics.

Moreover, in the chip-type solid electrolytic capacitor of the invention, only the surfaces of the electrode terminal portions of the resin shell on which the anode metal layer and the cathode metal layer will be formed are selectively roughened. Therefore, the remaining non-electrode-terminal portions are not roughened, and these portions accordingly become water-repellent, so that the treatment solution for forming the metal layers, free water in the moisture resistance test and salt water in the salt spray test can be prevented from entering the resin shell through the surface and affecting the $\tan\delta$ characteristics unfavorably.

Furthermore, in the chip-type solid electrolytic capacitor of the invention, the capacitor element is coated with the water-repellent resin by immersing it in the water-repellent resin so that the water-repellent resin not only coats the outermost surface of the capacitor element but also permeates inside of the valve-metal which constitutes the anode body thereby to form the protective film. Thus, free water and ionic substances which have entered from the outside will not contact with the valve-metal, so as to prevent deterioration of the electric characteristics of the solid electrolytic capacitor. Especially when plating is performed for forming the anode metal layer and the cathode metal layer, the capacitor element is immersed in a strong-acid/-strong-alkali solution at high temperature. In such a case, however, since the capacitor element is coated with the water-repellent resin, deterioration of the electric characteristics can be prevented.

Besides, in the chip-type solid electrolytic capacitor of the invention, the resin shell, which coats the capacitor element with the anode lead wire being led out on one side, has the concave portion formed on the side of the anode lead wire, and the anode lead wire is formed with the weakened point and bent so that the anode lead wire will be encased in the concave portion. Since the anode lead wire is bent at the weakened point, it can be bent easily. Also, it can be always bent at a certain position, so that the anode lead wire will not extend out of the outer size of the capacitor, and that a large length of the anode lead wire can be led out from the resin shell, thereby increasing the area of contact between the anode-side terminal portion formed on the side of the anode lead wire, and the anode lead wire, and substantially enhancing their bonding strength. Thus, it is possible to eliminate deterioration of the $\tan\delta$ characteristics and poor tightness in the solder heat resistance test and various environmental tests.

What is claimed is:

1. A chip-type solid electrolytic capacitor comprising:

a capacitor element having a body, an anode lead wire implanted in the body so that one end of the anode lead wire extends from the body, and a cathode section on the body;

a resin shell which coats a portion of said capacitor element so that said anode lead wire and said cathode section are exposed, the resin shell having a surface roughened by both sandblast and chemical etching; and an anode metal layer and a cathode metal layer, respectively, formed on said surface roughened by both sandblast and chemical etching to contact said anode lead wire and said cathode section, respectively.

2. A chip-type solid electrolytic capacitor according to claim 1, wherein a cathode lead surface of said cathode conductive layer is roughened.

3. A chip-type solid electrolytic capacitor according to claim 1, wherein said anode lead wire and said cathode section extend in opposite directions from said body.

4. A method for manufacturing a chip-type solid electrolytic capacitor, comprising:

forming a capacitor element having a body, an anode lead wire implanted in said body so that one end of said anode lead wire extends from said body, and a cathode section on the body;

coating said capacitor element with a resin shell so that said anode lead wire and said cathode section are exposed;

roughening a surface of said resin shell by sandblast and chemical etching; and forming an anode metal layer and a cathode metal layer, respectively, on said surface of said resin shell which is roughened by sandblast and chemical etching so that said anode metal layer and said cathode metal layer contact said anode lead wire and said cathode section, respectively.

5. A chip-type solid electrolytic capacitor according to claim 4, wherein said anode lead wire and said cathode section extend in opposite directions from said body.

6. A method for manufacturing a chip-type solid electrolytic capacitor, comprising:

forming a capacitor element having a body, an anode lead wire implanted in said body so that one end of said anode lead wire extends from said body, and a cathode section on said body;

coating said capacitor element with a resin shell so that said anode lead wire and said cathode section are exposed;

roughening a surface of said resin shell and a surface of said anode lead wire by sandblast and chemical etching;

forming an anode metal layer on a first portion of said surface of said resin shell which is roughened and on said surface of said anode lead wire which is roughened; and forming a cathode metal layer on a second portion of said surface of said resin shell which is roughened to contact said cathode section.

7. A chip-type solid electrolytic capacitor according to claim 6, wherein said anode lead wire and said cathode section extend in opposite directions from said body.

8. A chip-type solid electrolytic capacitor comprising:

a capacitor element having a body, an anode lead wire implanted in said body so that one end of said anode lead wire extends from a first surface of said body, and a cathode layer formed at least on a second surface of said body which is opposite to said first surface;

a cathode conductive layer formed on a portion of the cathode layer of said capacitor element which is formed on said second surface, and including a cathode lead surface which is roughened by sandblast and chemical etching;

a resin shell which coats said capacitor element and said cathode conductive layer except for at least a portion of said anode lead wire and at least a portion of said cathode lead surface; and an anode metal layer and a cathode metal layer formed on said resin shell to contact said portion of said anode lead wire and said cathode lead surface, respectively.

9. A method for manufacturing a chip-type solid electrolytic capacitor, comprising:

forming a capacitor element having a body, an anode lead wire embedded in said body so that one end of said anode lead wire extends from a first surface of said body, and a cathode layer formed at least on a second surface of said body which is opposite to said first surface;

forming a cathode conductive layer on a portion of the cathode layer of said capacitor element which is formed on said second surface, said cathode conductive layer having a cathode lead surface;

coating said capacitor element and said cathode conductive layer with a resin shell except for a portion of said anode lead wire and said cathode lead surface;

roughening said cathode lead surface by sandblast and chemical etching; and forming an anode metal layer and a cathode metal layer on said resin shell to contact said anode lead wire and said cathode lead surface, respectively.

10. A method for manufacturing a chip-type solid electrolytic capacitor, comprising:

forming a capacitor element having a body, an anode lead wire which is implanted in said body so that one end of said anode lead wire extends from a first surface of said body, and a cathode layer formed at least on a second surface of said body which is opposite to said first surface;

forming a cathode conductive layer on a portion of the cathode layer of said capacitor element which is formed on said second surface, said cathode conductive layer having a cathode lead surface;

coating said capacitor element and said cathode conductive layer with a resin shell except for a portion of said anode lead wire and said cathode lead surface;

roughening a surface of said resin shell and the cathode lead surface by sandblast and chemical etching; and forming an anode metal layer and a cathode metal layer on said surface of said resin shell which is roughened to contact said anode lead wire and said cathode lead surface, respectively.

11. A method for manufacturing a chip-type solid electrolytic capacitor, comprising:

forming a capacitor element having a body, an anode lead wire implanted in said body so that one end of said anode lead wire extends from a first surface of said body, and a cathode layer formed at least on a second surface of said body which is opposite to said first surface;

forming a cathode conductive layer on a portion of the cathode layer of said capacitor element which is formed on said second surface, said cathode conductive layer having a cathode lead surface;

coating said capacitor element and said cathode conductive layer with a resin shell except for a portion of said anode lead wire and said cathode lead surface;

roughening a surface of said resin shell, said cathode lead surface of said cathode conductive layer and a surface of said portion of said anode lead wire by sandblast and chemical etching; and forming an anode metal layer and a cathode metal layer on said surface of said resin shell which is roughened to contact said surface of said portion of said anode lead wire which is roughened and said cathode lead surface, respectively.

12. A method for manufacturing a chip-type solid electrolytic capacitor, comprising:

forming a capacitor element having a body, an anode lead wire implanted in said body so that one end of said anode lead wire extends from a first surface of said body, and a cathode layer formed at least on a second surface of said body which is opposite to said first surface;

forming a cathode conductive layer on a portion of the cathode layer of said capacitor element which is formed on said second surface, said cathode conductive layer having a cathode lead surface;

coating said capacitor element and said cathode conductive layer with a resin shell except for a portion of said anode lead wire and said cathode lead surface;

roughening only surfaces of said resin shell on which an anode metal layer and a cathode metal layer are to be formed, said roughening being performed by sandblast and chemical etching, said surfaces of said resin shell being disposed so that said anode metal layer and said cathode metal layer will contact said anode lead wire and said cathode lead surface, respectively; and forming the anode metal layer and the cathode metal layer on said resin shell.

* * * * *